Oct. 16, 1956 C. I. BOHLEN 2,767,015
END CLOSURES FOR HEAT-INSULATED FLOOR
OF REFRIGERATED TRAILER
Filed Aug. 20 1953 4 Sheets-Sheet 2

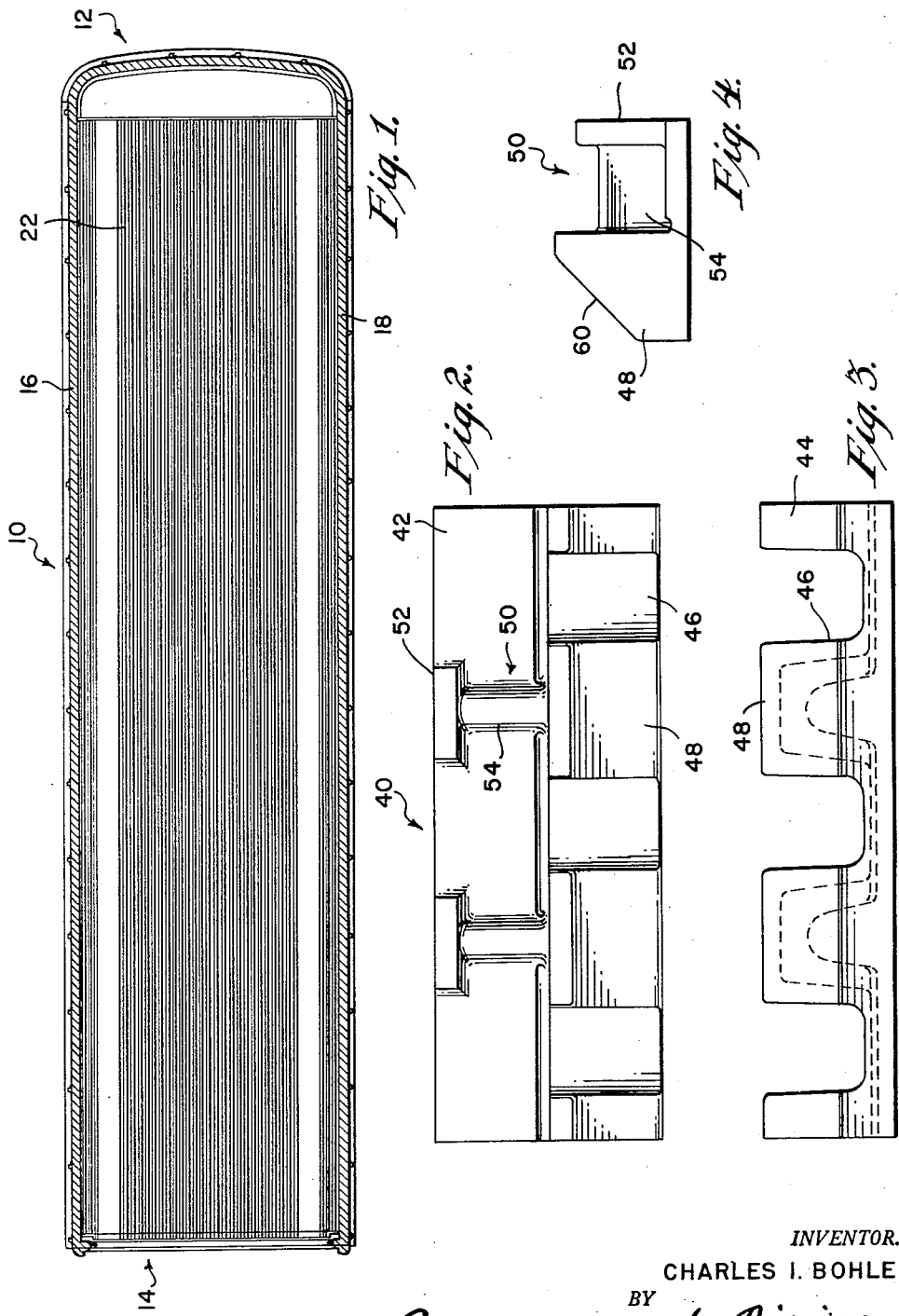

INVENTOR.
CHARLES I. BOHLEN
BY
Caesar and Rivise
ATTORNEYS.

INVENTOR.
CHARLES I. BOHLEN
BY Caesar and Rivise
ATTORNEYS.

Oct. 16, 1956
C. I. BOHLEN
2,767,015
END CLOSURES FOR HEAT-INSULATED FLOOR OF REFRIGERATED TRAILER
Filed Aug. 20, 1953
4 Sheets-Sheet 4
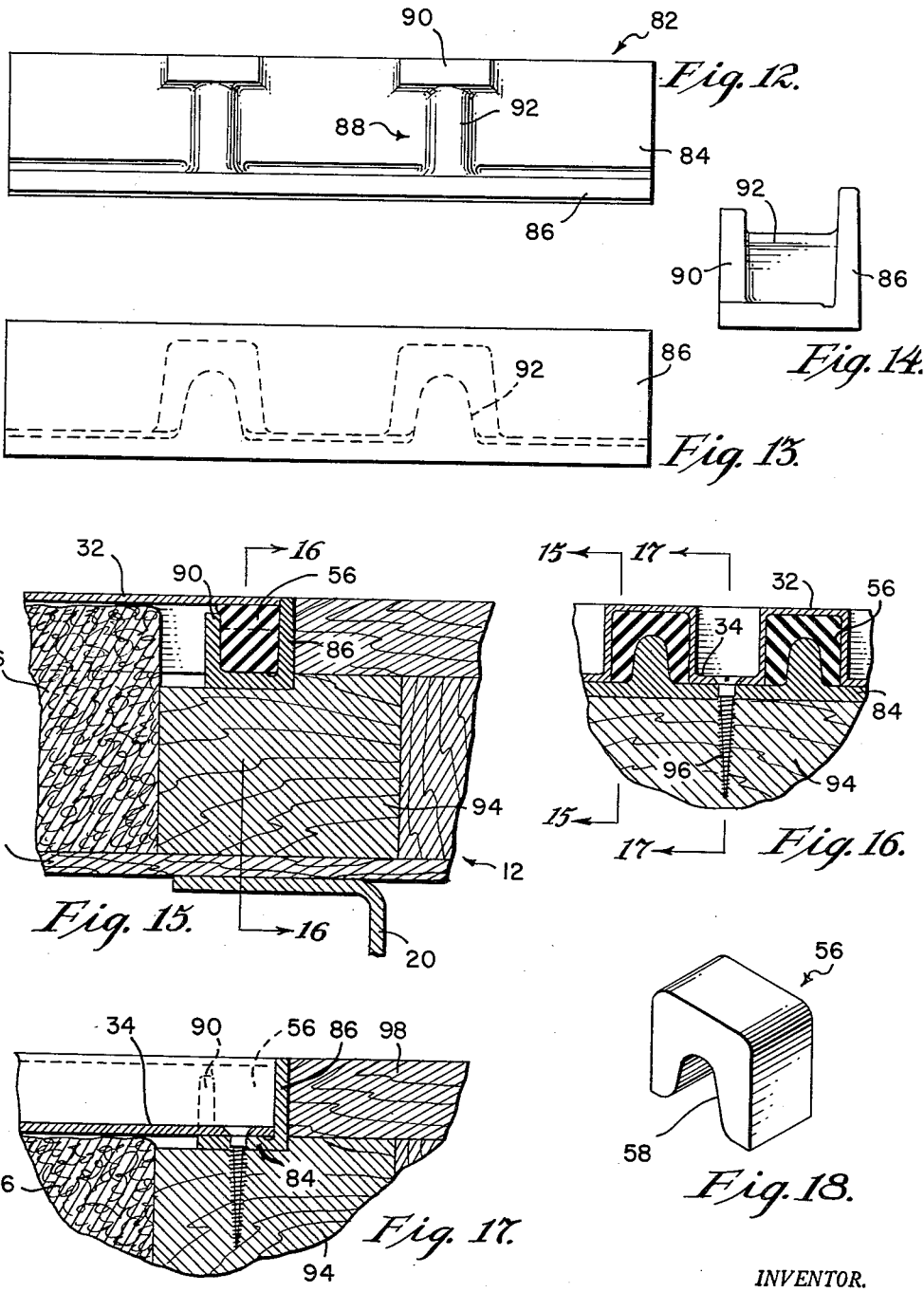
INVENTOR.
CHARLES I. BOHLEN
BY
Caesar and Rivise
ATTORNEYS.

United States Patent Office 2,767,015
Patented Oct. 16, 1956

2,767,015

END CLOSURES FOR HEAT-INSULATED FLOOR OF REFRIGERATED TRAILER

Charles I. Bohlen, Doylestown, Pa., assignor, by mesne assignments, to Fruehauf Trailer Company, Detroit, Mich., a corporation of Michigan Application August 20, 1953, Serial No. 375,501

8 Claims. (Cl. 296—28)

This invention relates to closures for the front and rear ends of a channelled floor in a refrigerated trailer.

In refrigerated trailers, it is conventional to provide a floor made of interconnected extruded channel sections which are mounted upon a heat-insulating material such as Fiberglas which is in turn supported upon the cross-sills of the trailer. Heretofore, the front and rear open ends of the longitudinally extending channels were sealed by welding plates to the ends of the channels.

It is the primary object of the present invention to provide end closures for a channelled floor which are secured to the floor by bolts or screws, thus obviating the necessity of welding the end closures to the floor.

Another object of this invention is to provide end closures for the channelled floor of a refrigerated trailer which are made of standard cast aluminum sections, thus effecting savings in costs and materials.

A further object of the invention is to provide end closures for the channelled floor of a refrigerated trailer which are provided with a means to seal the ends of the floor against moisture.

And yet another object of the invention is to provide a closure for the rear end of the channelled floor of a refrigerated trailer which not only seals the end against moisture, but reinforces the floor against end shock.

These and other objects of the invention will become more apparent as the following description proceeds in conjunction with the accompanying drawings, wherein:

Figure 1 is a top plan view of a refrigerated trailer with a channelled floor therein;

Figure 2 is a top plan view of an end closure section for the rear end of the floor;

Figure 3 is a rear side elevational view of the end closure section shown in Figure 2;

Figure 4 is an end elevational view of the end closure shown in Figure 2;

Figure 12 is a top plan view of a closure for the front end of the floor;

Figure 13 is a front side elevational view of the end closure shown in Figure 12;

Figure 14 is an end elevational view of the closure shown in Figure 12;

Figure 15 is a sectional view taken on the line 15—15 of Figure 16;

Figure 16 is a reduced sectional view taken on the line 16—16 of Figure 15;

Figure 17 is a sectional view taken on the line 17—17 of Figure 16; and

Figure 18 is a perspective view of one of the rubber grommets used in connection with the front and rear end closures.

Specific reference will now be made to the drawings, wherein similar reference characters are used for corresponding elements throughout.

Figure 5:
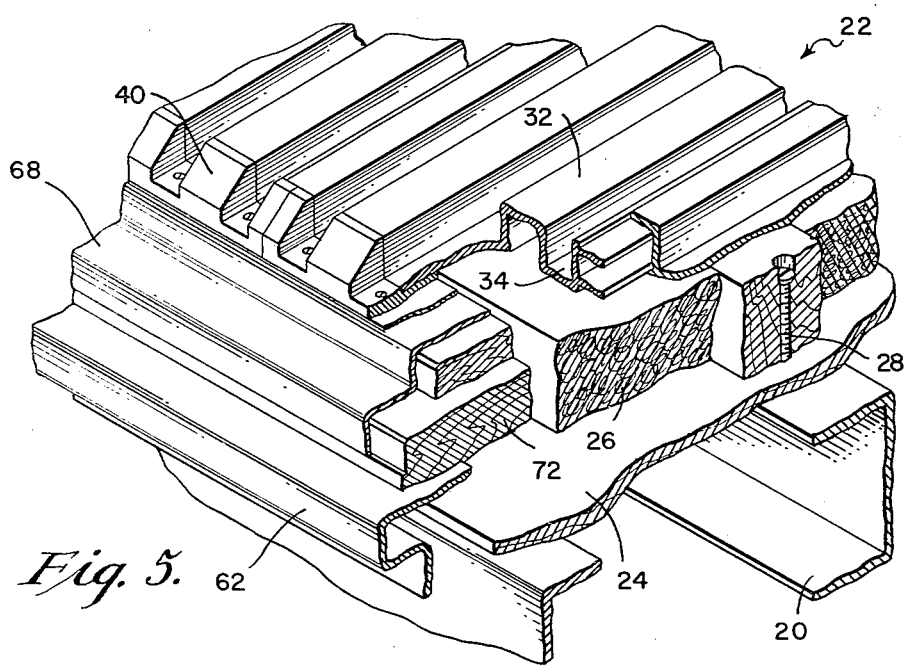
Figure 5 is a fragmentary enlarged perspective view of the rear portion of the trailer illustrating the manner in which the end closures are assembled thereon, parts being shown in section to illustrate details of construction.

The refrigerated trailer is generally indicated at 10, and includes a front end 12, a rear end 14, side panels 16 and 18, cross-sills 20 extending transversely of the trailer and a floor construction 22 mounted upon the cross-sills between the sides and front and rear ends of the trailer.

Figures 6, 7:
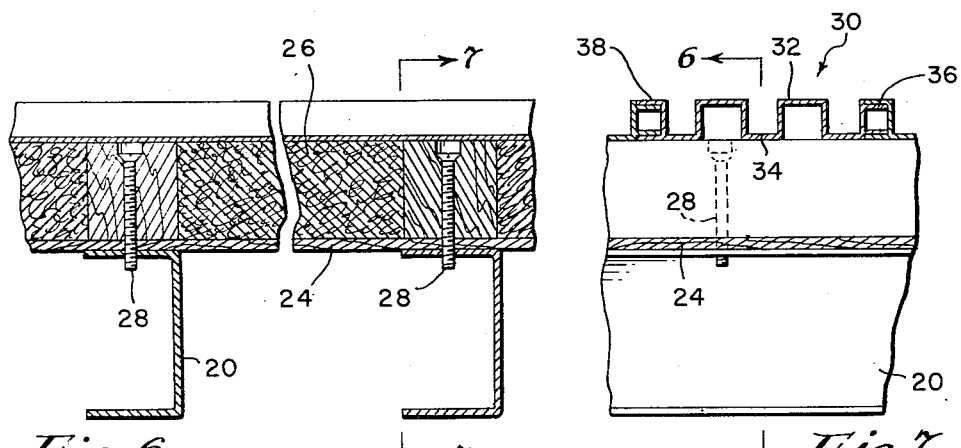
Figure 6 is a sectional view taken on the line 6—6 of Figure 7.
Figure 7 is a sectional view taken on the line 7—7 of Figure 6.
Figure 8:
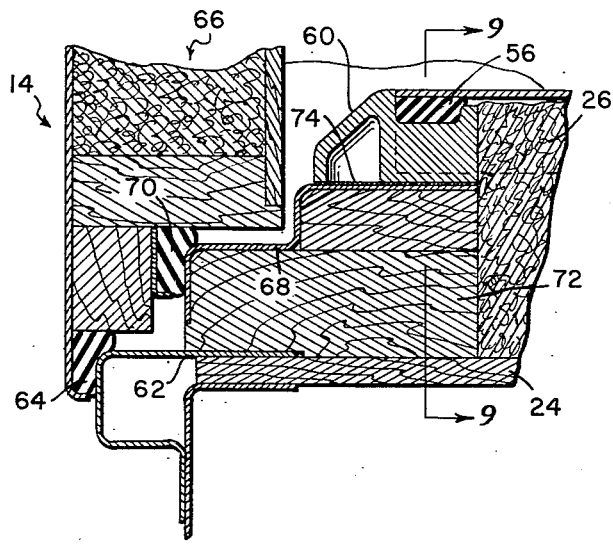
Figure 8 is an enlarged fragmentary vertical sectional view through the rear end of the trailer and the door associated therewith.

In conventional construction, a plywood floor board 24 is mounted upon the cross-sills 20 and insulation in the form of Fiberglas 26 is mounted upon the floor board by suitable recessed screws 28. The floor 22, which is mounted upon the insulation 26, consists of sections of extruded aluminum channels which are interconnected transversely of the trailer, the channels running lengthwise of the trailer. Each section 30 of the floor 22 is corrugated in cross section and includes alternate raised and lowered channels 32 and 34 respectively. The lowered channels 34 constitute drain and air passages, one of the rear corners of the floor being provided with a drainage spout or port (not shown). One end of each channelled floor section 30 is provided with a reduced U-shaped member 36, while the other end is provided with an enlarged U-shaped member 38. These members 36 and 38 serve as tongue and groove connections for the corresponding ends of adjacent floor sections 30, as shown clearly in Figure 7.

Coming now to the closure for the rear end of the channelled floor 22, the same is clearly illustrated in Figures 1-5 and 8-10. The end closure comprises a plurality of cast aluminum sections 40 which are positioned end to end transversely across the trailer as shown more specifically in Figure 5. Each end closure section comprises a horizontally extending plate 42 integral with or otherwise secured to a vertically extending plate 44. The vertical plate 44 includes spaced depressions 46 which are in registry with the lowered drain channels 34 of the floor 22. The remainder of the vertical plate 44 consists of spaced elevated portions 48 which are in registry with raised channels 32 of the floor 22.

The horizontal plate 42 underlies the channelled floor 22. The vertical and horizontal plates 42 and 44 of the end closure 40 carry plugs 50 in alignment with the elevated portions 48 of the vertical plate 44. The forward ends of the plugs 50 are provided with upstanding flanges 52, while the remainder of the plug constitutes a reduced shank portion 54. The plug 50 is received in the raised channels 32 of the floor through their open rear ends. Removably received upon the shank portion 54 of each of the plugs 50 between the flange 52 and the elevated portion 48 is a resilient member, preferably in the form of a rubber grommet 56, which includes a generally U-shaped opening 58 which embraces the shank 54. The rubber grommet 56 bears against the inner surfaces of the raised floor channels 32 and the elevated portions 48 of the vertical plate 44 abut against the open rear ends of said raised channels 32. This construction provides a seal of the rear end of the channelled floor against moisture.

The upper surface 60 of the elevated portions 48 of the end closure is downwardly and rearwardly inclined to provide a ramp or threshold. This feature together with the fact that the horizontal plate 42 underlies the channelled floor reinforces the floor against end shock and load impact.

The rear end of the floor of the trailer is further preferably provided with a transversely channeled plate 62 which receives the floor board 24, and constitutes an abutment for the rubber gasket 64 at the lower marginal edge of a conventional, heat-insulated refrigerator door 66 hinged to the rear end of the trailer. The rear end of the trailer is further provided with an additional transversely extending plate 68, of step formation, which includes a portion that abuts against a further gasket 70 associated with the refrigerator door 66. Said stepped plate 68 is mounted upon suitable transversely extending boards 72, a portion of the horizontal plate 42 of the end closure resting upon the uppermost surface of said stepped plate. Preferably, a felt strip 74 is interposed between the horizontal plate and the stepped plate 68 as shown clearly in Figure 8.

Figure 11:
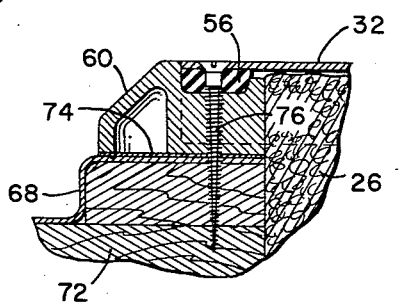
Figure 11 is a fragmentary sectional view through the rear end of the trailer, showing a modified means of securing the end closure to the floor.
Figure 9:
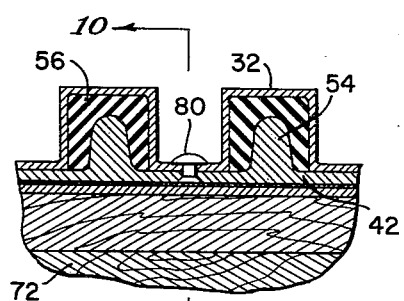
Figure 9 is a reduced sectional view taken on the line 9—9 of Figure 8.
Figure 10:
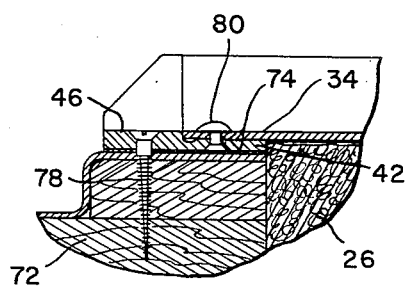
Figure 10 is a sectional view taken on the line 10—10 of Figure 9.

Various means may be used to secure the end closure to the floor. One such means is illustrated in Figure 11, and comprises a plurality of screws 76 which extend through the upper surface of the raised floor channels 32, the grommets 56, the plugs 50, the felt strip 74, the stepped plate 68 and the supporting boards 72.

Another effective means of securing the end closures to the floor comprises the provision of screws 78 which extend through the depressed portions 46 of the end closure and in turn through the felt strip 74, the stepped plate 68 and the supporting boards 72. Additionally, rivets 80 are provided securing the depressed floor channels 34 to the horizontal plate 42 of the end closure, as shown clearly in Figure 10.

The closure for the forward end of the channelled floor is shown in Figures 12–17. The same comprises a plurality of cast aluminum sections 82 which are placed end to end transversely across the forward portion of the trailer. Each section comprises a horizontal plate 84 which is integral with or otherwise secured to a vertical plate 86 so that the section is substantially L-shaped. Carried by the plates 84 and 86 are plugs 88 which include rear upstanding flanges 90, and a reduced shank portion 92. The rubber grommet 56 is removably received upon each of the shanks 92 of the plugs in the same manner as previously described in connection with the rear end closures.

Mounted upon the plywood floor board 24 at the front end of the trailer and extending transversely thereof is a suitable board 94.

The end closure is positioned in such a way that the horizontal plate 84 thereof underlies the channelled floor and rests upon the transverse board 94. The plugs 92 and associated rubber grommets 56 fit into the raised floor channels 32, the vertical plate 86 abutting the free open ends of the raised and depressed channels 32 and 34.

The end closures are secured to the floor by any suitable means, but preferably by means of screws 96 which extend through the depressed channels 34, the horizontal plate 84, and into the transverse board 94, as shown clearly in Figures 16 and 17. The front end of the trailer may be finished in the usual manner by providing a nose board 98 to the rear of the end closures 82.

While a preferred embodiment of the invention has been shown and described hereabove, it will be understood that minor variations of the construction and the arrangement of parts may be made by skilled artisans without departing from the spirit of the invention and the scope of the appended claims.

I claim:

1. In a refrigerated trailer having a floor including longitudinally extending interconnected alternate raised and depressed channels said floor being corrugated in transverse cross-section, an end closure for said floor comprising a plate having interconnected vertical and horizontal arms, plugs carried by the horizontal arms and loosely received in said raised channels through their ends, resilient members mounted on said plugs and bearing against the inner surfaces of said raised channels, and means to secure said plate to said floor.

2. In a refrigerated trailer having a floor including longitudinally extending interconnected alternate raised and depressed channels said floor being corrugated in transverse cross-section, an end closure for the rear of said floor comprising a plate having interconnected horizontal and vertical arms, said vertical arm including a downwardly and rearwardly inclined surface constituting a ramp, plugs carried by the horizontal arms and loosely received in said raised channels through their ends, resilient members mounted on said plugs and bearing against the inner surfaces of said raised channels, and means to secure said plate to said floor.

3. In a refrigerated trailer having a floor including interconnected sections forming longitudinally extending alternate raised and lowered channels said floor being corrugated in transverse cross-section, an end closure for the rear of said floor comprising sections of plates abutting each other at their ends and extending transversely of the trailers, each plate section including a horizontal arm underlying the floor, a vertically extending arm integral with said horizontal arm abutting the open ends of raised floor channels and including spaced depressions in registry with the lowered floor channels, said vertically extending arm including a downwardly and rearwardly inclined ramp surface, plugs integral with said horizontal arm and loosely received in said raised channels, resilient members mounted on said plugs and bearing against the inner surfaces of said raised channels, and means to secure said plates to said floor.

4. The combination of claim 3 wherein each of said plugs includes an upstanding flange and a reduced shank portion and each of said resilient members embraces said shank portion and is disposed between said flange and said vertically extending plate.

5. In a refrigerated trailer having a floor including interconnected sections forming longitudinally extending alternate raised and lowered channels said floor being corrugated in transverse cross-section, an end closure for the front of said floor comprising sections of plates abutting each other at their ends and extending transversely of the trailer, each of said plates being L-shaped and having vertical and horizontal arms, said horizontal arm underlying said floor and said vertical arm abutting the front ends of said floor channels, plugs integral with said arms and loosely received in said raised floor channels, resilient members mounted on said plugs and bearing against the inner surfaces of said raised floor channels, and means to secure said plate to said floor.

6. The combination of claim 5 wherein each of said plugs includes an upstanding flange and a reduced shank portion and each of said resilient members embraces said shank portion and is disposed between said flange and said vertical arm.

7. In a vehicle having a channel floor of corrugated transverse cross-section, the channels of said floor being open at least at one end of said floor, a closure for said open end comprising a plate having a horizontal portion underlying the floor and a vertical portion abutting the open end of the floor, plugs extending upwardly from said horizontal portion and received in the crest portions of the corrugations, resilient members mounted on said plugs and bearing against the inner surfaces of said crest portions, and means securing said plate to the floor.

8. In a vehicle having a channel floor of corrugated transverse cross-section, the channels of said floor being open at least at one end of said floor, a closure for said open end comprising a plate having horizontal and vertical arms, said vertical arm abutting the open ends of the crest portions of the corrugations and including spaced depressions in registry with the trough portions of the corrugations, said horizontal arm underlying the floor and including upstanding plugs received in said crest portions, and means securing said plate to the floor.

References Cited in the file of this patent

UNITED STATES PATENTS

| | | |
|---|---|---|
| 2,275,037 | Watter | Mar. 3, 1942 |
| 2,504,657 | Dean | Apr. 18, 1950 |
| 2,615,751 | Black | Oct. 28, 1952 |